United States Patent [19]

Watanabe

[11] Patent Number: 4,749,861
[45] Date of Patent: Jun. 7, 1988

[54] METHOD AND APPARATUS FOR RADIATION IMAGE READ-OUT

[75] Inventor: Hideo Watanabe, Kanagawa, Japan

[73] Assignee: Fuji Photo Film Co., Ltd., Kanagawa, Japan

[21] Appl. No.: 786,459

[22] Filed: Oct. 11, 1985

[30] Foreign Application Priority Data

Oct. 11, 1984 [JP] Japan ................. 59-212939

[51] Int. Cl.4 ................................ G03C 5/16
[52] U.S. Cl. ................ 250/327.2; 250/484.1
[58] Field of Search ................ 250/327.2, 484.1

[56] References Cited

U.S. PATENT DOCUMENTS 4,369,367 1/1983 Horikawa ............ 250/327.2
4,571,493 2/1986 Horikawa ............ 250/327.2
4,582,988 4/1986 Aagano .............. 250/327.2
4,636,641 1/1987 Mori et al. ........... 250/327.2

Primary Examiner—Carolyn E. Fields
Attorney, Agent, or Firm—Sughrue, Mion, Zinn, Macpeak & Seas

[57] ABSTRACT

In a system for reading out a radiation image stored in a stimulable phosphor sheet by exposing it to stimulating rays which cause it to emit light in proportion to the stored radiation energy, the emitted light is detected by a first photoelectric read-out unit, and noise light other than the aforesaid emitted light is detected by a second photoelectric read-out unit. The image signal detected by the second photoelectric read-out unit and multiplied by a predetermined coefficient is subtracted from the image signal detected by the first photoelectric read-out unit. The result of the subtraction is used as the read-out image signal for reproducing a visible radiation image.

7 Claims, 2 Drawing Sheets

METHOD AND APPARATUS FOR RADIATION IMAGE READ-OUT

BACKGROUND OF THE INVENTION

1. Field of the Invention

This invention relates to a radiation image read-out method in a radiation image recording and reproducing system wherein a stimulable phosphor sheet is used, and an apparatus for carrying out the method.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photo sensitive material or on a display device such as a cathode ray tube (CRT).

FIG. 3 is a perspective view showing the conventional read-out apparatus used in the aforesaid radiation image recording and reproducing system for scanning a stimulable phosphor sheet carrying a radiation image stored therein by stimulating rays such as a laser beam which cause the sheet to emit light in proportion to the stored radiation energy, and photoelectrically detecting the emitted light.

In the apparatus of FIG. 3, stimulating rays 2 are emitted by a stimulating ray source 1, and the beam diameter of the stimulating rays 2 is strictly adjusted by a beam expander 3. The stimulating rays 2 are then deflected by a light deflector 4 formed of a galvanometer mirror or the like, and are made to impinge upon the stimulable phosphor sheet 10 by a plane reflection mirror 5. Between the light deflector 4 and the plane reflection mirror 5 is positioned an f$\theta$ lens 6 for maintaining the beam diameter of the stimulating rays 2 uniform during the constant-speed scanning of the stimulating rays 2 in the main scanning direction as indicated by the arrow A on the stimulable phosphor sheet 10. While the stimulating rays 2 impinge upon the stimulable phosphor 10, the sheet 10 is moved in a sub-scanning direction at a predetermined angle with respect to the main scanning direction, e.g. as indicated by the arrow B, and consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light guide member 8 has a linear light input face 8a positioned close to a scanning line 2a on the stimulable phosphor sheet 10, and a ring-shaped light output face 8b in close contact with the light receiving face of a photodetector 9, which may be a photomultiplier. The light guide member 8 and the photodetector 9 constitute a photoelectric read-out means 7. The light guide member 8 is fabricated of a transparent thermoplastic resin sheet such as an acrylic resin sheet so that the light entering from the light input face 8a can be transmitted to the light output face 8b by total reflection inside of the light guide member 8. The light emitted by the stimulable phosphor sheet 10 upon stimulation thereof is guided inside of the light guide member 8, emitted from the light output face 8b of the light guide member 8 and received by the photodetector 9. The light guide member 8 may be of a shape and a material as disclosed in U.S. Pat. No. 4,346,295.

The light detected by the photodetector 9 is converted thereby into an electric signal, and the output signal of the photodetector 9 is amplified, A/D converted and subjected to a signal processing. Thereafter, the electric signal is used for reproducing a visible image on a recording material such as a photographic film or on a display device such as a CRT.

However, when the time interval between radiation image recording on a stimulable phosphor sheet and image read-out therefrom is short in the aforesaid conventional radiation image read-out apparatus, not only the light emitted by the stimulable phosphor sheet in proportion to the stored radiation energy when the sheet is exposed to stimulating rays but also an instantaneous light emission after-glow (noise) are detected by the photodetector. Therefore, the radiation image is not detected accurately, and the contrast of the reproduced visible image becomes low. By "instantaneous light emission after-glow" is meant the after-glow of light instantaneously emitted by the stimulable phosphor when it is exposed to radiation for image recording. The instantaneous light emission after-glow continues to be emitted by the whole exposed surface of the stimulable phosphor sheet 10 for a fixed time after it is exposed to radiation.

Specifically, in the aforesaid conventional radiation image read-out apparatus, the light input face 8a of the light guide member 8 is positioned facing the scanning line 2a over the whole width of the stimulable phosphor sheet 10 in the main scanning direction, and all light entering the light guide member 8 from its light input face 8a is detected by the photodetector 9. Therefore, the radiation after-glow emitted by the whole width region of the stimulable phosphor sheet 10 standing face to face with the light input face 8a is detected by the photodetector 9, and the aforesaid problems are caused by the detected instantaneous light emission after-glow.

In the present invention, detection of the light emitted by the stimulable phosphor sheet in proportion to the stored radiation energy when it is scanned by stimulating rays is often referred to as read-out from the stimulable phosphor sheet.

SUMMARY OF THE INVENTION

The primary object of the present invention is to provide a radiation image read-out method wherein a signal representing noise such as the instantaneous light emission after-glow detected together with the light emitted by a stimulable phosphor sheet in proportion to the stored radiation energy during the read-out from the stimulable phosphor sheet is eliminated from the read-out image signal, thereby accurately obtaining an image signal free from noise.

Another object of the present invention is to provide an apparatus for carrying out the method.

The present invention provides a radiation image read-out method for scanning a stimulable phosphor sheet carrying a radiation image stored therein by stimulating rays which cause the stimulable phosphor sheet to emit light in proportion to the stored radiation energy, and detecting the emitted light, wherein the improvement comprises the steps of:

(i) providing a first photoelectric read-out means for detecting said light emitted by said stimulable phosphor sheet in proportion to the stored radiation energy, and a second photoelectric read-out means for detecting only the noise light (such as an instantaneous light emission after-glow and a stimulated light emission after-glow, which will be explained hereinafter) other than said light emitted by said stimulable phosphor sheet in proportion to the stored radiation energy, (ii) detecting said light emitted by a read-out picture element (which is exposed to said stimulating rays at any given instant) on said stimulable phosphor sheet in proportion to the stored radiation energy by use of said first photoelectric read-out means, (iii) detecting said noise light, which is emitted by the sheet read-out region (i.e. the region of said sheet over which light emitted by the sheet is detected) of said first photoelectric read-out means at the time of detection of said light emitted by said read-out picture element in proportion to the stored radiation energy, by use of said second photoelectric read-out means, (iv) subtracting the read-out image signal of said second photoelectric read-out means multiplied by a predetermined coefficient (i.e. a coefficient fixed by the decay rate of said noise light over a time interval between the read-out by one photoelectric read-out means and the read-out by the other photoelectric read-out means, the difference in read-out efficiency between the photoelectric read-out means, or the like) from the read-out image signal detected by said first photoelectric read-out means, and (v) using the result of the subtraction as the read-out image signal at said read-out picture element.

The method of the present invention is carried out by a radiation image read-out apparatus comprising:

(i) a scanning means comprising a stimulating ray source for emitting stimulating rays, a light deflection means for scanning a stimulable phosphor sheet carrying a radiation image stored therein by said stimulating rays, which cause said stimulable phosphor sheet to emit light in proportion to the stored radiation energy, in a main scanning direction, a first photoelectric read-out means for detecting the light emitted by said stimulable phosphor sheet during said scanning in the main scanning direction, and a second photoelectric read-out means for detecting only noise light other than said light emitted by said stimulable phosphor sheet in proportion to the stored radiation energy, (ii) a movement means for moving said stimulable phosphor sheet relative to said scanning means in a sub-scanning direction at a predetermined angle with respect to said main scanning direction, (iii) a multiplier for multiplying the output of said second photoelectric read-out means by a predetermined coefficient, (iv) a subtracter for subtracting the output of said multiplier from the output of said first photoelectric read-out means, (v) said second photoelectric read-out means being positioned on the upstream side or on the downstream side of said first photoelectric read-out means in the sheet movement direction (i.e. the sub-scanning direction) so that said second photoelectric read-out means has a sheet read-out region of approximately the same shape as the shape of the sheet read-out region of said first photoelectric read-out means and said sheet read-out region of said second photoelectric read-out means approximately coincides with the sheet read-out region of said first photoelectric read-out means when said sheet read-out region of said second photoelectric read-out means is moved by a predetermined distance in the sheet movement direction or reversely, and (vi) a delay means for delaying either the output of said first photoelectric read-out means or the output of said second photoelectric read-out means at the same sheet read-out region and sending it to said subtracter so that said outputs are simultaneously input to said subtracter.

The subtracter is positioned on the output side of the second photoelectric read-out means when the first photoelectric read-out means is positioned on the downstream side of the second photoelectric read-out means in the sheet movement direction, and is positioned on the output side of the first photoelectric read-out means when the first photoelectric read-out means is positioned on the upstream side of the second photoelectric read-out means.

In the present invention, it is possible to obtain an image signal free from the component of noise light, particularly the instantaneous light emission after-glow, and representing only the light emitted by the stimulable phosphor sheet in proportion to the stored radiation energy, and therefore to prevent the image contrast from being deteriorated by the instantaneous light emission after-glow or the like.

DESCRIPTION OF THE PREFERRED EMBODIMENTS

The present invention will hereinbelow be described in further detail with reference to the accompanying drawings.

Figure 1:
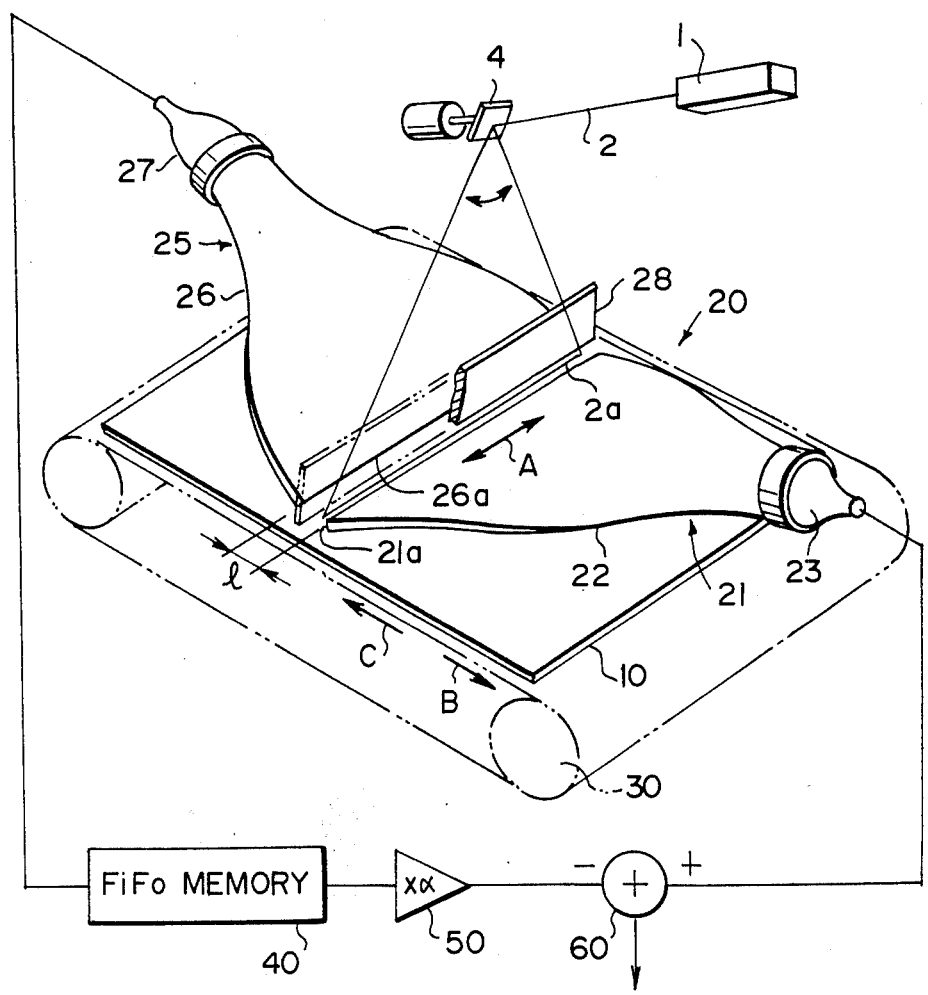
FIG. 1 is a schematic view showing an embodiment of the radiation image read-out apparatus in accordance with the present invention.

FIG. 1 schematically shows an embodiment of the radiation image read-out apparatus in accordance with the present invention, wherein the first photoelectric read-out means is positioned on the downstream side of the second photoelectric read-out means in the sheet movement direction. In FIG. 1, similar elements are numbered with the same reference numerals with respect to FIG. 3.

The radiation image read-out apparatus comprises a stimulating ray source 1 for emitting stimulating rays 2, for example, a laser beam, a light deflection means 4 constituted by a galvanometer mirror or the like for deflecting the stimulating rays 2 and making them impinge upon a stimulable phosphor sheet 10 carrying a radiation image stored therein in the main scanning direction as indicated by the arrow A, and a scanning means 20. The scanning means 20 comprises a stimulating ray source 1 for emitting stimulating rays 2, a light deflection means 4 for scanning a stimulable phosphor sheet 10 carrying a radiation image stored therein by the stimulating rays 2, which cause the stimulable phosphor sheet 10 to emit light in proportion to the stored radiation energy, in a main scanning direction, a first photoelectric read-out means 21 for detecting light emitted by the stimulable phosphor sheet 10 during the scanning with the stimulating rays 2 in the main scanning direction, and a second photoelectric read-out means 25 for detecting only noise light such as an instantaneous light emission after-glow and a stimulated light emission after-glow other than the light emitted by the stimulable phosphor sheet 10 in proportion to the stored radiation energy. (The light is emitted by a read-out picture element on the stimulable phosphor sheet exposed to the stimulating rays in proportion to the stored radiation energy as described above. Also, an after-glow of the light continues to be emitted by the read-out picture element after exposure of the read-out picture element to the stimulating rays is ceased. Such an after-glow is referred to as the stimulated light emission after-glow.)

The apparatus is also provided with a movement means 30 for moving the stimulable phosphor sheet 10 relative to the scanning means 20 in the sub-scanning direction as indicated by the arrow B at a predetermined angle with respect to the main scanning direction.

Figure 3:
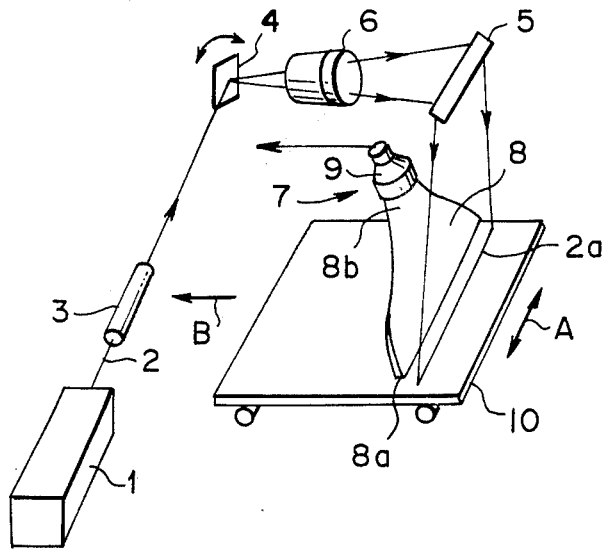
FIG. 3 is a schematic view showing the conventional radiation image read-out apparatus.

The first photoelectric read-out means 21 is provided with a light guide member 22 and a photodetector 23 constituted by a photomultiplier or the like, which are constructed in the same manner as those of the photoelectric read-out means shown in FIG. 3. The second photoelectric read-out means 25 is provided with a light guide member 26 and a photodetector 27 constituted by a photomultiplier or the like which are constructed in the same manner as those of the photoelectric read-out means shown in FIG. 3, and a light shielding plate 28 positioned opposite to the first photoelectric read-out means 21 upstream of a scanning line 2a. The light shielding plate 28 intercepts the light emitted by the scanning line 2a in proportion to the stored radiation energy so that the light does not impinge upon a light input face 26a of the light guide member 26 of the second photoelectric read-out means 25. Instead of the light shielding plate 28, a filter for reflecting or absorbing the light emitted by the scanning line 2a in proportion to the stored radiation energy and transmitting noise light may be provided on the light input face 26a.

In the embodiment shown, the sheet movement means 30 is constituted by a belt conveyor which moves the stimulable phosphor sheet 10 in the sub-scanning direction as indicated by the arrow B approximately normal to the main scanning direction. However, the sheet movement means 30 may be of any other type insofar as it moves the sheet 10 relative to the scanning means 20, and may be of the type moving the components of the scanning means 20 integrally with each other in the direction as indicated by the arrow C.

The second photoelectric read-out means 25 is positioned on the upstream side of the first photoelectric read-out means 21 as viewed in the sheet movement direction so that the second photoelectric read-out means 25 has a sheet read-out region of approximately the same shape as the sheet read-out region of the first photoelectric read-out means 21, and the sheet read-out region of the second photoelectric read-out means 25 approximately coincides with the sheet read-out region of the first photoelectric read-out means 21 when the sheet read-out region of the second photoelectric read-out means 25 is moved by a predetermined distance in the movement direction of the sheet 10 as indicated by the arrow B.

In the embodiment of FIG. 1, the shape of the sheet read-out region is fixed by the shape of the light input face of the light guide member, the distance between the light input face and the stimulable phosphor sheet, the angle of the light input face with respect to the stimulable phosphor sheet, and the like. Therefore, the second photoelectric read-out means 25 is fabricated and positioned to match the first photoelectric read-out means 21 so that the shape of sheet read-out regions fixed by these factors become approximately the same. Also, like the light input face 21a of the first photoelectric read-out means 21, the light input face 26a of the second photoelectric read-out means 25 is also positioned parallel to the main scanning direction as indicated by the arrow A, i.e. the light input face 26a and the light input face 21a extend in the same direction and the sheet read-out region of the second photoelectric read-out means 25 coincides with the sheet read-out region of the first photoelectric read-out means 21 when the sheet read-out region of the second photoelectric read-out means 25 is moved by a predetermined distance in the movement direction of the stimulable phosphor sheet 10 as indicated by the arrow B.

The output of the second photoelectric read-out means 25 is sent to a delay means 40 constituted by a first-in first-out memory and is sent out of the delay means 40 after a predetermined time elapses so that the output is sent to a subtracter 60 at the predetermined delay time after the output of the first photoelectric read-out means 21. The predetermined delay time is equal to the time taken for the sheet read-out region of the second photoelectric read-out means 25 at any given instant to come to coincide approximately with the sheet read-out region of the first photoelectric read-out means 21 by the movement of the stimulable phosphor sheet 10, i.e. the time taken for the sheet 10 to move by the distance l between the light input faces 21a and 26a. By the delaying, it becomes possible to process the read-out image signals input from the first photoelectric read-out means 21 and the second photoelectric read-out means 25 as the read-out image signals at the same region on the stimulable phosphor sheet 10.

The output of the delay means 40 is sent to a multiplier 50 for multiplying by a predetermined coefficient $\alpha$. The predetermined coefficient $\alpha$ is used for calculating the image signal representing the amount of noise light contained in the image signal detected by the first photoelectric read-out means 21 on the basis of the image signal representing the amount of noise light detected by the second photoelectric read-out means 25, and is fixed by the read-out efficiency of the first photoelectric read-out means 21 and the second photoelectric read-out means 25, the decay rate of noise light (only the instantaneous light emission after-glow in this case) during the time interval between the detection by the second photoelectric read-out means 25 and the subsequent detection by the first photoelectric read-out means 21, or the like.

The output of the multiplier 50 is sent to the subtracter 60 which subtracts the output of the multiplier 50 from the output of the first photoelectric read-out means 21.

Image read-out by the radiation image read-out apparatus constructed as described above will hereinbelow be described.

When light emitted by an arbitrary read-out picture element in proportion to the stored radiation energy is detected by the first photoelectric read-out means 21, the instantaneous light emission after-glow emitted by the sheet read-out region of the first photoelectric read-out means 21 at the given instant is also detected by the first photoelectric read-out means 21. Therefore, the read-out image signal obtained by the first photoelectric read-out means 21 contains the image signal representing the instantaneous light emission after-glow.

In the apparatus of the present invention, the instantaneous light emission after-glow emitted by the same sheet read-out region is detected by the second photoelectric read-out means 25 prior to the detection by the first photoelectric read-out means 21. Therefore, by multiplying the read-out image signal of the second photoelectric read-out means 25 by a coefficient fixed by calculation or experimentally based on the after-glow decay rate, the difference in read-out efficiency between the first photoelectric read-out means 21 and the second photoelectric read-out means 25, or the like, it is possible to calculate accurately the component of the instantaneous light emission after-glow contained in the read-out image signal of the first photoelectric read-out means 21. The image signal representing the instantaneous light emission after-glow and calculated in this manner is delayed for a predetermined time by the delay means 40, and then sent to the subtracter 60 when image read-out is conducted on the sheet read-out region by the first photoelectric read-out means 21. In this manner, it is possible to eliminate the image signal representing the instantaneous light emission after-glow contained in the read-out image signal of the first photoelectric read-out means 21, and therefore to obtain an accurate image signal.

Figure 2:
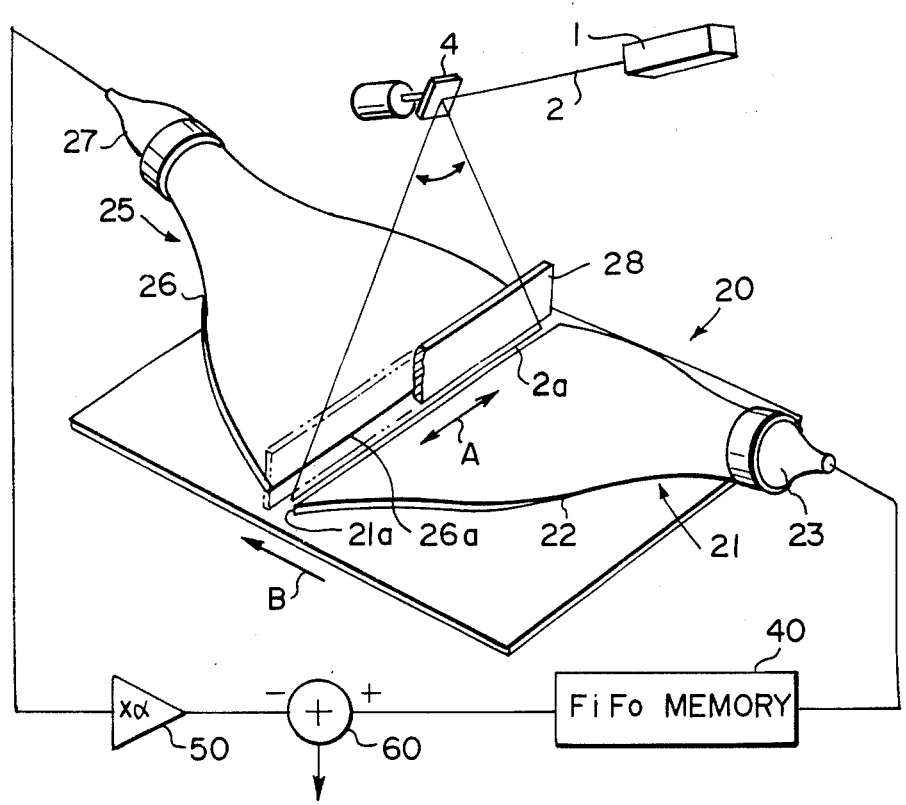
FIG. 2 is a schematic view showing another embodiment of the radiation image read-out apparatus in accordance with the present invention.

FIG. 2 shows another embodiment of the radiation image read-out apparatus in accordance with the present invention. In this embodiment, the second photoelectric read-out means 25 is positioned on the downstream side of the first photoelectric read-out means 21 in the movement direction of the stimulable phosphor sheet 10 as indicated by the arrow B. The delay means 40 is positioned on the side of the first photoelectric read-out means 21 positioned on the upstream side in the movement direction of the sheet 10.

In the embodiment of FIG. 2, the read-out region on the stimulable phosphor sheet 10 at any given instant is first exposed to the stimulating rays and read out by the first photoelectric read-out means 21, and then noise light is detected by the second photoelectric read-out means 25. Therefore, unlike the embodiment of FIG. 1, both the instantaneous light emission after-glow and the stimulated light emission after-glow are detected by the second photoelectric read-out means 25. Accordingly, it is possible to eliminate also the signal representing the stimulated light emission after-glow contained in the read-out image signal detected by the first photoelectric read-out means 21.

I claim:

1. A radiation image read-out method for scanning a stimulable phosphor sheet (10) carrying a radiation image stored therein by stimulating rays (2) which cause the stimulable phosphor sheet to emit light in proportion to the stored radiation energy, and detecting the emitted light, wherein the improvement comprises the steps of:
   (i) providing a first photoelectric read-out means (21) for detecting the light emitted by said stimulable phosphor sheet in proportion to the stored radiation energy, and a second photoelectric read-out means (25) for detecting only the noise light other than said light emitted by said stimulable phosphor sheet in proportion to the stored radiation energy,
   (ii) detecting the light emitted by a read-out picture element at a first sheet read-out region on said stimulable phosphor sheet in proportion to the stored radiation energy by use of said first photoelectric read-out means.
   (iii) detecting said noise light, which is emitted by a second sheet read-out region on said stimulable phosphor sheet which substantially coincides with the first sheet read-out region of said first photoelectric read-out means at the time of detection of said light emitted by said read-out picture element in proportion to the stored radiation energy, by use of said second photoelectric read-out means.
   (iv) subtracting the read-out image signal of said second photoelectric read-out means multiplied by a predetermined coefficient ($\alpha$) from the read-out image signal detected by said first photoelectric read-out means, and
   (v) using the result of the subtraction as the read-out image signal at said read-out picture element,
   wherein said first photoelectric read-out means and said second photoelectric read-out means are spaced from each other with a scanning line (2a) of said stimulating rays intervening therebetween, and wherein said light emitted by said stimulable phosphor sheet in proportion to the stored radiation energy is prevented from impinging upon said second photoelectric read-out means by use of a light shielding member (28).

2. A method as defined in claim 1 wherein the detection of said emitted light by said first photoelectric read-out means is conducted at a predetermined time interval after the detection of said noise light by said second photoelectric read-out means.

3. A method as defined in claim 1 wherein the detection of said noise light by said second photoelectric read-out means is conducted at a predetermined time interval after the detection of said emitted light by said first photoelectric read-out means.

4. A radiation image read-out apparatus comprising:
   (i) a scanning means comprising a stimulating ray source (1) for emitting stimulating rays (2), a light deflection means (4) for scanning a stimulable phosphor sheet (10) carrying a radiation image stored therein by said stimulating rays, which cause said stimulable phosphor sheet to emit light in proportion to the stored radiation energy, in a min scanning direction (A), a first photoelectric read-out means (21) for detecting the light emitted by said stimulable phosphor sheet during said scanning in the main scanning direction, and a second photoelectric read-out means (25) for detecting only noise light other than said light emitted by said stimulable phosphor sheet in proportion to the stored radiation energy, (ii) a movement means (30) for moving said stimulable phosphor sheet relative to said scanning means in a sub-scanning direction (B) at a predetermined angle with respect to said main scanning direction, (iii) a multiplier (50) for multiplying the output of said second photoelectric read-out means by a predetermined coefficient ($\alpha$), (iv) a subtractor (60) for subtracting the output of said multiplier from the output of said first photoelectric read-out means, (v) said second photoelectric read-out means being positioned on the upstream side of said first photoelectric read-out means in the sheet movement direction so that said second photoelectric read-out means has a sheet read-out region of approximately the same shape as the shape of the sheet read-out region of said first photoelectric read-out means and said sheet read-out region of said second photoelectric read-out means approximately coincides with the sheet read-out region of said first photoelectric read-out means when said sheet read-out region of said second photoelectric read-out means is moved by a predetermined distance in the sheet movement direction, and (vi) a delay means (40) positioned between said second photoelectric read-out means and said subtractor for delaying the output of said second photoelectric read-out means for a predetermined time and sending the output thereof to said subtractor, wherein said second photoelectric read-out means includes a light shielding member (28) positioned opposite to said first photoelectric read-out means upstream of a scanning line of said stimulating rays.

5. An apparatus as defined in claim 4 wherein said delay means is constituted by a first-in first-out memory.

6. A radiation image read-out apparatus comprising:

(i) a scanning means comprising a stimulating ray source for emitting stimulating rays, a light deflection means for scanning a stimulable phosphor sheet carrying a radiation image stored therein by said stimulating rays, which cause said stimulable phosphor sheet to emit light in proportion to the stored radiation energy, in a main scanning direction, a first photoelectric read-out means for detecting the light emitted by said stimulable phosphor sheet during said scanning in the main scanning direction, and a second photoelectric read-out means for detecting only noise light other than said light emitted by said stimulable phosphor sheet in proportion to the stored radiation energy, (ii) a movement means for moving said stimulable phosphor sheet relative to said scanning means in a sub-scanning direction at a predetermined angle with respect to said main scanning direction, (iii) a multiplier for multiplying the output of said second photoelectric read-out means by a predetermined coefficient, (iv) a subtractor for subtracting the output of said multiplier from the output of said first photoelectric read-out means, (v) said second photoelectric read-out means being positioned on the downstream side of said first photoelectric read-out means in the sheet movement direction so that said second photoelectric read-out means has a sheet read-out region of approximately the same shape as the shape of the sheet read-out region of said first photoelectric read-out means and said sheet read-out region of said second photoelectric read-out means approximately coincides with the sheet read-out region of said first photoelectric read-out means when said sheet read-out region of said second photoelectric read-out means is moved by a predetermined distance in a direction opposite to the sheet movement direction, and (vi) a delay means positioned between said first photoelectric read-out means and said subtractor for delaying the output of said first photoelectric read-out means for a predetermined time and sending the output thereof to said subtractor, wherein said second photoelectric read-out means includes a light shielding member positioned opposite to said first photoelectric read-out means downstream of a scanning line of said stimulating rays.

7. An apparatus as defined in claim 6 wherein said delay means is constituted by a first-in first-out memory.

* * * * *